United States Patent
Kuzma et al.

(10) Patent No.: US 11,021,381 B2
(45) Date of Patent: *Jun. 1, 2021

(54) TWO STAGE ANAEROBIC DIGESTION WITH INTERMEDIATE HYDROLYSIS

(71) Applicant: Anaergia Inc., Burlington (CA)

(72) Inventors: Matthew John Kuzma, Encinitas, CA (US); Juan Carlos Josse, Aliso Viejo, CA (US)

(73) Assignee: ANAERGIA INC., Burlington (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/722,061

(22) Filed: Dec. 20, 2019

(65) Prior Publication Data
US 2020/0123035 A1   Apr. 23, 2020

Related U.S. Application Data

(63) Continuation of application No. 15/671,704, filed on Aug. 8, 2017, now Pat. No. 10,550,023.

(60) Provisional application No. 62/377,946, filed on Aug. 22, 2016.

(51) Int. Cl.
| | |
|---|---|
| *C02F 3/28* | (2006.01) |
| *C02F 1/02* | (2006.01) |
| *C02F 11/04* | (2006.01) |
| *C02F 11/12* | (2019.01) |
| *C02F 11/18* | (2006.01) |
| *C02F 1/20* | (2006.01) |
| *C02F 11/125* | (2019.01) |

(52) U.S. Cl.
CPC .............. *C02F 3/286* (2013.01); *C02F 1/025* (2013.01); *C02F 11/04* (2013.01); *C02F 1/20* (2013.01); *C02F 11/125* (2013.01); *C02F 11/18* (2013.01); *C02F 2301/08* (2013.01)

(58) Field of Classification Search
CPC .......... C02F 3/286; C02F 11/04; C02F 1/025; C02F 2301/08; C02F 11/125; C02F 11/18; C02F 1/20
USPC ................................ 210/603, 609, 252, 259
See application file for complete search history.

(56) References Cited

U.S. PATENT DOCUMENTS

| | | | | |
|---|---|---|---|---|
| 8,445,259 | B2 * | 5/2013 | Kang ........................ | C05F 3/00 435/262 |
| 9,809,481 | B2 * | 11/2017 | Josse ....................... | C02F 11/12 |
| 2009/0209025 | A1 * | 8/2009 | Goschl ................... | C12M 29/18 435/262.5 |

(Continued)

FOREIGN PATENT DOCUMENTS

| | | |
|---|---|---|
| DE | 102014116239 A1 * | 5/2016 |
| WO | 2013155630 A1 | 10/2013 |

(Continued)

OTHER PUBLICATIONS

U.S. Appl. No. 15/671,704, Non-Final Office dated Sep. 13, 2018.

(Continued)

*Primary Examiner* — Fred Prince
(74) *Attorney, Agent, or Firm* — Borden Ladner Gervais LLP; Michael Damiani

(57) ABSTRACT

In a system and process, sludge is treated by two stages of anaerobic digestion in series separated by intermediate thickening and hydrolysis. The hydrolysis product is transferred to the second digester essentially without dilution.

13 Claims, 1 Drawing Sheet

(56) References Cited

U.S. PATENT DOCUMENTS

| | | | | |
|---|---|---|---|---|
| 2010/0255562 | A1* | 10/2010 | Kang | C02F 9/00 |
| | | | | 435/262 |
| 2012/0094363 | A1* | 4/2012 | Nawawi-Lansade | C02F 11/04 |
| | | | | 435/262 |
| 2012/0145627 | A1* | 6/2012 | Benedek | B01D 61/145 |
| | | | | 210/601 |
| 2013/0213883 | A1* | 8/2013 | Josse | C02F 3/302 |
| | | | | 210/630 |
| 2014/0346108 | A1* | 11/2014 | Josse | C05F 17/10 |
| | | | | 210/605 |

FOREIGN PATENT DOCUMENTS

| | | | |
|---|---|---|---|
| WO | WO 2013155630 A1 * | 10/2013 | |
| WO | 2014137218 A1 | 9/2014 | |
| WO | WO 2014137218 A1 * | 9/2014 | |
| WO | 2016066752 A1 | 5/2016 | |
| WO | WO 2016066752 A1 * | 5/2016 | |

OTHER PUBLICATIONS

U.S. Appl. No. 15/671,704, Non-Final Office dated Apr. 17, 2019.
U.S. Appl. No. 15/671,704, Notice of allowance dated Sep. 25, 2019.

* cited by examiner

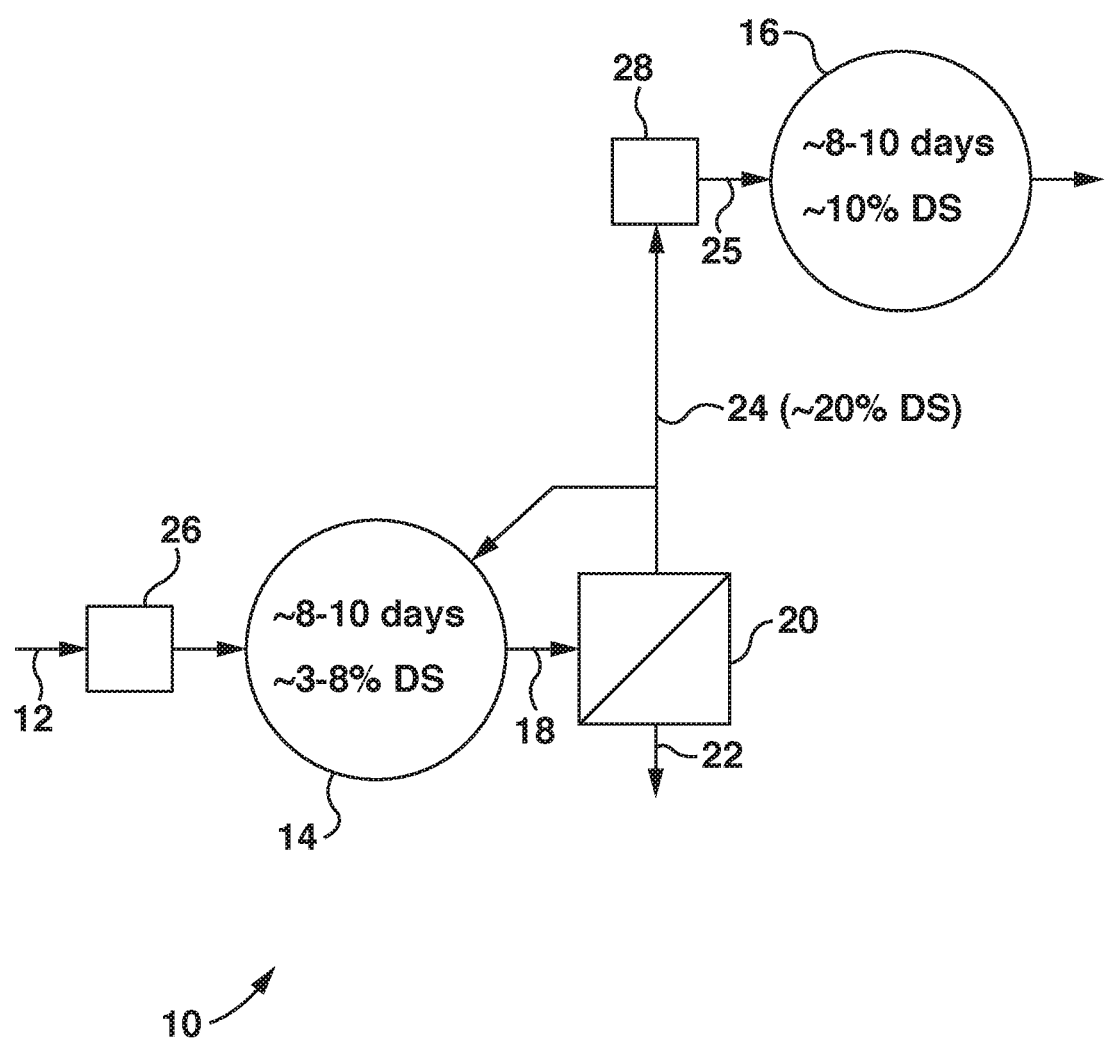

TWO STAGE ANAEROBIC DIGESTION WITH INTERMEDIATE HYDROLYSIS

CROSS-REFERENCE TO RELATED APPLICATIONS

This application is a continuation of U.S. application Ser. No. 15/671,704, filed Aug. 8, 2017, which is a non-provisional application of U.S. Application Ser. No. 62/377,946, filed Aug. 22, 2016. U.S. application Ser. No. 15/671,704 and 62/377,946 are incorporated by reference.

FIELD

This specification relates to treating waste sewage sludge and anaerobic digestion.

BACKGROUND

A typical wastewater treatment plant (WWTP) produces one or more sewage sludges such as primary sludge and waste activated sludge. Some or all of the sewage sludge may be thickened up to about 6 wt % dried solids. The sewage sludge can be further treated in a mesophilic anaerobic digester. The resulting digestate is a Class B biosolid with no value or limited value.

Thermal hydrolysis is most commonly used in commercial anaerobic digesters according to the CAMBITHP process. In the typical form of this process, waste sludge is hydrolysed by a combination of heat (about 160 degrees C.) and pressure (at least several atmospheres) prior to anaerobic digestion. Because the viscosity of the waste sludge is reduced in the process, the waste sludge may be thickened, for example to about 8-16% dried solids by weight (DS) before hydrolysis. The anaerobic digester then operates at about 4-6% DS in the digester compared to 2-3% DS for a conventional digester coupled to a WWTP.

International Publication Numbers WO 2014/137218 and WO 2016/066752 give examples of the use of thermal hydrolysis devices in combination with anaerobic digesters.

Introduction to the Invention

When thermal hydrolysis is added upstream of an anaerobic digester, biogas production is increased. However, this gain is countered by the energy required for thermal hydrolysis. In more recent proposals, thermal hydrolysis is performed on dewatered digestate from a first stage digester. The hydrolysis product is diluted and sent to a second stage digester. This provides an improvement in the energy balance. The inventors believe, however, that the energy balance or resource recovery, or both, can be improved by minimizing or avoiding the dilution.

This specification describes a system and process in which digestate from a first digester is thickened or dewatered, hydrolysed and then treated essentially without dilution in a high solids digester, optionally a mechanically mixed wet digester. A first stage digester optionally also operates at an elevated solids content, for example up to 8% or more DS in the digester. First stage digestate may optionally be thickened or dewatered to 15% or more or 18% DS or more, for example about 20% DS. The second stage digester operates at 7% or more, or 9% or more, DS in the digester, optionally up to about 15% DS. Mixing is enabled by the use of mechanical mixers in at least the second stage digester. Ammonia inhibition is avoided by withdrawing a liquid fraction of the first stage digestate from the system.

BRIEF DESCRIPTION OF THE FIGURES

FIG. 1 shows a process flow diagram of a waste sludge treatment system.

DETAILED DESCRIPTION

FIG. 1 shows a sludge treatment system 10. The system 10 may be used, for example, to treat sludge 12 from a municipal wastewater treatment plant (WWTP) (not shown). The sludge may include primary sludge, waste activated sludge, or both. The sludge 12, or part of it, may have been pre-thickened in the wastewater treatment plant, for example up to a sludge 12 solids content of about 4-6% DS.

The system 10 includes a first anaerobic digester 14 and a second anaerobic digester 16. The digesters 14, 16 are configured in series. The digesters 14, 16 are, generally speaking, covered tanks with mixers. In the case of an existing WWTP, there may already be a digester tank, or two digester tanks configured in parallel, operated with hydraulic and solids retention times of about 20 days. These tanks might be suitable to be converted for use in the system 10. Alternatively, one or more new digesters may be constructed.

Digester operation in the system 10 is preferably with a low hydraulic retention time, for example 6-12 days or 8-10 days, in the downstream digester 16 or both digesters 14, 16. The solids content in the digesters 14, 16 is higher than in a typical WWTP. For example, the second digester 16 may operate at 7% DS or more, for example about 10% DS, in the digester. The first digester may operate at about 3-8% DS or in the digester, for example 5-8% DS. The solids content in the second digester 16, and possibly also in the first digester 14, is too high for conventional gas mixing. The second digester 16, and optionally the first digester 14, are mixed with hydraulic or electrical mixers, for example as sold under the OMNIVORE trade mark by Anaergia.

A first digestate 18 is drawn from the first digester 14. Although the term digestate is sometimes used to refer specifically to the solids fraction in digested sludge, in this document "digestate" refers to the sludge removed from a digester unless indicated otherwise. The first digestate 18 is dewatered in dewatering unit 20. Dewatering unit 20 may be, for example, a screw dewaterer having a tapered auger inside of a cylindrical screen. Alternatively, a high solids content producing sludge thickener may be used.

The dewatering unit 20 produces a liquid fraction 22 and a solid fraction 24. The liquid fraction 22 contains ammonia and is preferably treated to extract the ammonia, for example by passing the liquid fraction through an ammonia stripper. The extracted ammonia can be processed to produce, for example, ammonium hydroxide or ammonium sulfate, which are useful in making fertilizer. The ammonia depleted liquid fraction 22 can optionally be treated for further resource recovery (for example of phosphorous) before being returned to the head of the WWTP.

Optionally, a portion of the solid fraction 24 may be recycled to the first digester 14. This provides recuperative thickening of the digester 14 thereby increasing the solids content in the digester 14 and its solids retention time. In another option (which may be used instead of or in combination with recuperative thickening) a high solids thickener 26 (for example a screw thickener) is added upstream of the first digester. The thickener 26 may increase the solids content of sludge 12 to 8% DS or more or 10% DS or more, for example, 10-16% DS. The thickener 26 may be, for example, a belt or screw thickener. A suitable screw thickener is shown in International Publication Number WO 2013/155630 A1, Sludge Screw Thickener with Screen Rotation During Cleaning, by Anaergia Inc., which is incorporated herein by reference. In another option, the first digester 14 may receive sludge 12 at 2-6% DS solids, although the sludge 12 is preferably at least thickened to 4-6% DS using conventional low solids thickening equipment conventionally used in a WWTP. The first digester 14 optionally operates at a solids content of 3-8% DS or more, for example 3-8% DS. The hydraulic retention time in the first digester 14 is optionally 6-12 or 8-10 days.

The solid fraction 24 may have a solids content of at least 15%. At this solids content, some high solids thickeners may be useful in place of dewatering unit 20. However, it is preferable for solid fraction 24 to have a higher solids content, for example at least 16% or at least 18% or at least 20%, for example about 20%.

The solid fraction 24 is treated in a hydrolysis unit 28. In some examples, the hydrolysis unit 28 may be a thermal hydrolysis unit that uses heat, and optionally pressure, to treat the solid fraction 24. Commercial hydrolysis units are available, for example, from Cambi, Veolia, Lystek and OpenCell. The hydrolysis unit 28 hydrolyses large molecules remaining in the solid fraction 24. Since treatment in the first digester 14 is conducted at a low solids residence time, for example about 8-10 days, at least some of the solids are not completely digested before hydrolysis. The hydrolysis unit 28 completes hydrolysis and may also lyse some cells in the solid fraction 24.

The hydrolysed solids fraction 24 is treated in second digester 16. The hydrolysed solids fraction 25 is preferably not substantially diluted (or diluted at all), but sent to the second digester at a high solids content, for example 15% or more, 16% or more, 18% or more, or 20% or more, for example about 20%. The second digester 16 may operate at 7% DS or more, or 9% DS or more, solids in the digester. This is enabled by using mechanical, rather than air, mixers in digester 16. Mechanical mixers may use a spinning blade or other moving solid object in contact with the digestate to stir or otherwise mix the digestate in the digester tank. A suitable digester 20 and mixers are available from UTS or Anaergia, for example as sold under the OMNIVORE trade mark. Hydraulic residence time in the second digester 16 is optionally about 8-10 days.

High torque, low speed submersible mixers in at least the second digester 16, and optionally the first digester 14, are preferred. UTS Products GmbH in Lippetal, Germany manufactures high solids content submersible mixers 70 driven by a hydraulic motor, also available through the related company UTS Biogas Ltd., Cambridgeshire, UK, and Anaergia Services in the US under the OMNIVORE trade mark. Each mixer uses a 22 kW external hydraulic power unit and circulates biodegradable hydraulic oil, such that if leaks occur inside the digester then the bacteria can degrade the non-toxic leaked oil. Usually two or more mixers are needed per digester tank, depending on the digester tank dimensions. Alternatively, UTS electrical mixers with a permanent magnet synchronous motor may be used. These mixers are described in German patent application 10 2014 116 239.0 entitled "Verfahren zum Betreiben einer Ruhreinrichtung and eines Fermenters" filed on Nov. 7, 2014 which is incorporated herein by reference. These mixers are able to mix digestate at 7%, 8%, 9% and even 10% or more TS. Use of an air mixer would require dilution of solids fraction 24 but this would prevent recovery of ammonia, in some cases encourage ammonia inhibition in digester 16, and result in less efficiency, or larger tank size, of digester 16.

The preferred digestate dewatering equipment is an enclosed rotary screw thickener with an internal screw, which is designed to thicken sludge with a high initial solids content. Alternatively, to handle even thicker digestate, the digestate 18 may be dewatered in two stages. The first stage is performed without polymer, for example in a screw thickener. In the second stage, the filtrate (liquid fraction) from the first stage is treated with polymer, for example in a centrifuge or screw thickener with smaller screen openings.

A digester operating at high solids content would normally be subject to ammonia inhibition. However, removing liquid fraction 22 also lowers the ammonia concentration in second digester 16. If the ammonia concentration in the second digester 16 exceeds potential inhibition levels, for example 5000-5500 mg/L, despite removal of liquid fraction 22, micronutrients, for example a source of volatile carbon to increase the C:N ratio, are added to the second digester 16.

U.S. Pat. No. 9,181,120 and US Publication 2012145627 and U.S. provisional application 62/265,691 filed on Dec. 10, 2015 are incorporated by reference.

Unless stated otherwise or apparent from the context, solids contents or concentrations mentioned above are dried solids (DS) measurements which would be the same as a total solids (TS) measurement. In digestate, the DS is roughly 10% higher than total suspended solids (TSS) and the total dissolved solids (TDS) is typically 2500 to 4000 mg/L (0.25 to 0.4%). For example, a 5% DS digestate may have 46,000 mg/L of TSS and 4000 mg/L TDS. Accordingly, solids contents or concentrations, unless specified otherwise, can generally be interpreted as TSS without causing a material difference in the process.

The descriptions of processes and apparatus above are to provide at least one example of an embodiment within each claim but not to limit or define any claim. However, multiple processes and apparatus have been described above and it is possible that a particular process or apparatus described above is not within a specific claim. Process parameters are given as examples of how a plant may be operated and are not meant to limit a claim unless explicitly recited in a claim. Other processes for similar applications might operate at parameters within ranges that are 50% or 100% larger in both directions than the parameter ranges described above, or within a 50% or 100% variation from a single parameter described above. If one or more elements or steps described above are used to treat other wastes or under other conditions, then one or more process ranges described above might not be suitable and would be substituted with other appropriate parameters. Various sub sets of the unit processes described in relation to plant 100 can be used in other treatment plants. Various sub sets of unit processes in the treatment plants described above may also be combined in ways other than those described to produce different treatment plants. The description of one process or apparatus may be useful in understanding another process or apparatus. Words such as "may", "preferable" or "typical", or variations of them in the description above, indicate that a process step or apparatus element is possible, preferable or typical, according to the word used, but still optional and not necessarily part of any claimed invention unless explicitly included in a claim.

We claim:

1. A process for treating wastewater treatment plant (WWTP) other sludge comprising the steps of,
feeding the WWTP or other sludge to an anaerobic digester;
thickening or dewatering digestate from the first anaerobic digester;
hydrolysing a first portion of the thickened or dewatered digestate;
returning a second portion of the thickened or dewatered digestate to the anaerobic digester.

2. The process of claim 1 comprising feeding the hydrolysis product at 15% DS or more to a second anaerobic digester.

3. The process of claim 1 comprising feeding the hydrolysis product at 18% DS or more to a second anaerobic digester.

4. The process of claim 1 comprising feeding the hydrolysis product at 20% DS or more to a second anaerobic digester.

5. The process of claim 1 comprising producing a liquid fraction of the digestate from the anaerobic digester while thickening or dewatering the digestate from the anaerobic digester and removing ammonia from the liquid fraction to produce an ammonia depleted liquid fraction.

6. The process of claim 5 wherein the sludge is from a WWTP and the ammonia depleted liquid fraction is returned to the WWTP.

7. The process of claim 1 comprising feeding the hydrolysis product to a second anaerobic digester and stirring the second anaerobic digester with an electric or hydraulic powered mixer.

8. The process of claim 1 comprising operating the anaerobic digester at 3-8% DS.

9. The process of claim 1 comprising stirring the anaerobic digester with an electric or hydraulic powered mixer.

10. The process of claim 1 wherein the second portion of the thickened or dewater digestate returns to the anaerobic digester at 15% DS or more.

11. A system for treating WWTP or other sludges comprising,
an anaerobic digester;
a sludge thickener or dewaterer downstream of the anaerobic digester; and,
a hydrolysis unit downstream of the anaerobic digester,
a recycle loop from between the sludge thickener or dewaterer and the hydrolysis unit to the anaerobic digester.

12. The system of claim 11 wherein the sludge thickener or dewaterer has a solids fraction outlet and a liquid fraction outlet, and the liquid fraction outlet is connected to a WWTP.

13. The system of claim 11 comprising a second anaerobic digester downstream of the hydrolysis unit.

* * * * *